Aug. 18, 1959  J. BAUDE  2,900,528
NETWORK PROTECTOR
Filed Nov. 26, 1957  2 Sheets-Sheet 1

Fig. 1

Inventor
John Baude
By Carl A. [illegible]
Attorney

Inventor
John Baude
By Carl W. Laumann Jr.
Attorney

United States Patent Office 2,900,528
Patented Aug. 18, 1959

2,900,528

NETWORK PROTECTOR

John Baude, Milwaukee, Wis., assignor to Allis-Chalmers Manufacturing Company, Milwaukee, Wis.

Application November 26, 1957, Serial No. 699,106

32 Claims. (Cl. 307—87)

This invention relates generally to votage magnitude and phase sensitive circuits and in particular to control circuits for distribution network circuit breakers.

It is a generally accepted principle of distribution network operation that the circuit breaker connecting a transformer to the network should only be connected when the transformer voltage leads the network voltage and also exceeds the voltage on the network. In the past, this condition has been sensed by electromechanical means which had the disadvantages of mechanical devices. For example, a mechanical device presents a substantial problem in obtaining sensitivity without sacrificing reliable operation. The introduction of precision moving parts, necessary for sensitivity, increases the difficulty of maintaining the device since repairs cannot easily be made in the field. Mechanical relays are quite sensitive to harmonic voltages and may cause erratic operation of the protective system. Furthermore, a mechanical device is larger than is desirable since in many cases the circuit breaker and control unit are mounted on a power line pole.

This invention provides static means for comparing phase and magnitude of the voltages on opposite sides of the network circuit breaker. Since there are no moving parts, many of the problems associated with an electromechanical device are eliminated.

A device of this invention locates the vector representing the transformer voltage with respect to the vector representing the network voltage, and allows the breaker to close only when the transformer voltage exceeds the network voltage and leads the network voltage. This is accomplished by means of two circuits, one to locate a first phase angle boundary and the other to locate a second phase angle boundary, the two boundaries then defining the area of closure within which the transformer voltage vector must lie if the breaker is to be closed. The outputs of these two circuits control series switches, which may also be static device such as transistors or magnetic amplifiers, which in turn govern the closing of the breaker through conventional means. Unless the transformer voltage vector lies within the boundary established by one circuit and within the boundary established by the other circuit, one switch or both will be open to prevent the breaker from closing. Since all networks are not operated according to the same standards, an adjustment is provided which allows the closure boundaries to be varied.

It is therefore an object of this invention to provide a static device for vectorial comparison of alternating current voltages.

It is another object of this invention to provide a static device which makes a vectorial comparison of alternating current voltages and provides an output when the phase difference is within predetermined boundaries.

Another object of this invention is to provide a phase sensing circuit for the control of an alternating current network circuit breaker which prevents closure of the breaker under improper phase conditions.

Still another object of this invention is to provide a circuit breaker control for a distribution network which is easily maintained, small in size and has no moving parts.

A further object of this invention is to provide an improved network phase protector which is insensitive to harmonic voltages.

Other objects and advantages will be apparent from a consideration of the following description taken in connection with the accompanying drawings, in which.

Figure 1:
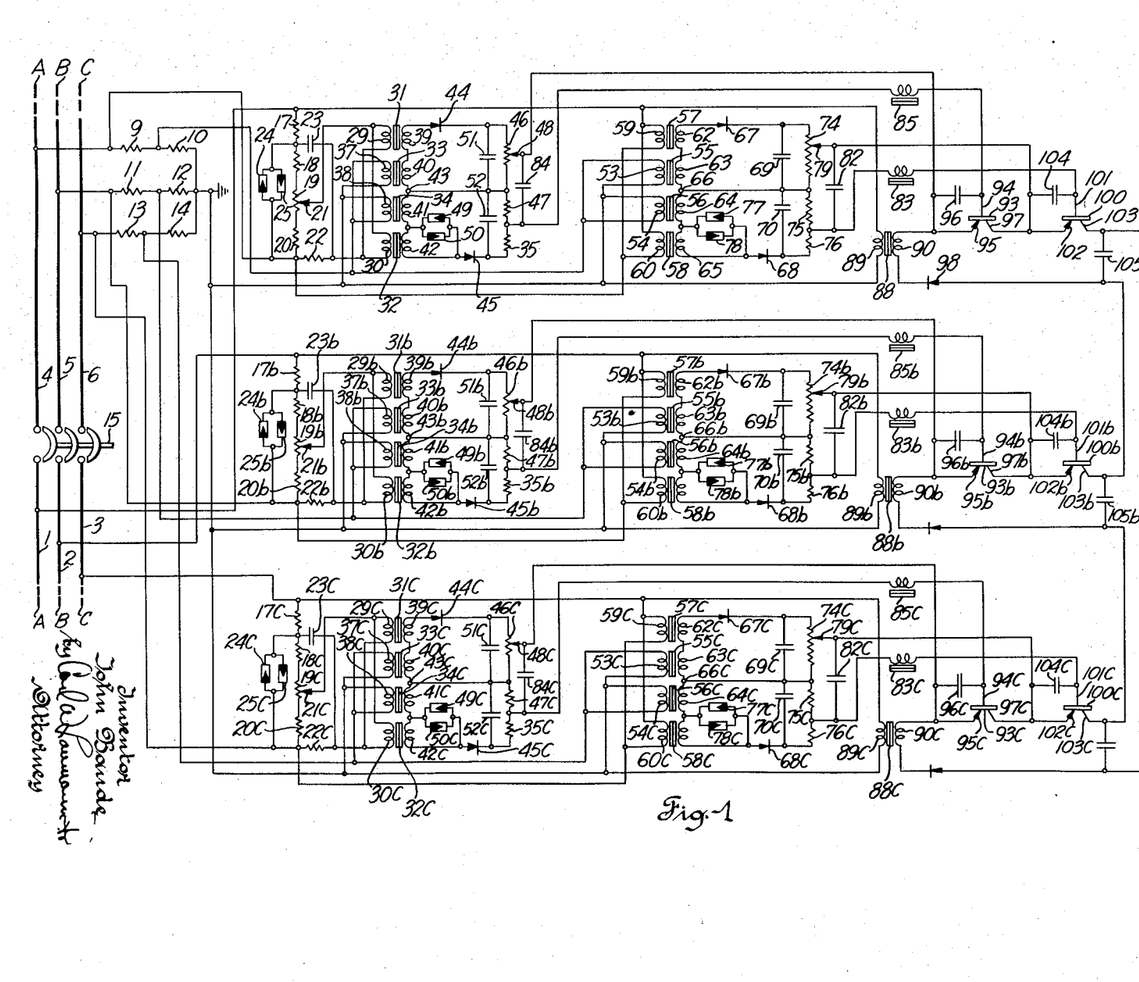
Fig. 1 is a schematic drawing of a portion of a network protector embodying the invention, showing the phase sensing portion of the circuit.

Referring more particularly to Fig. 1 of the drawing, a three phase circuit A, B and C, comprising conductors 1, 2 and 3, is fed from a transformer, not shown, and connected through a circuit breaker 15 to a network distribution system through conductors 4, 5 and 6. The network distribution system will be understood to have a plurality of similar feed points at various locations throughout the system.

Potential dividing resistors 9 and 10 are connected to give a measure of the phase A to neutral voltage in conjunction with resistors 11 and 12 for phase B and resistors 13 and 14 for phase C. Thus, the voltage across resistor 10 represents a portion of the phase to neutral voltage of phase A of the network.

The series resistors 17, 18, 19 and 20 are energized by the difference in voltage between the network side and the transformer side of the circuit breaker 15. This will be referred to as the phasing voltage. Limiting means such as a pair of varistors, 24 and 25, connected in opposing polarity, prevents the phasing voltage across the resistors 18, 19 and 20 from exceeding a predetermined amount by causing a varying IR drop across resistor 17. This prevents overloading portions of the circuit when the voltage difference across the breaker is great. A possible overload condition exists when the network is not energized and voltage exists only on the transformer side of the breaker.

A resistor 22 and capacitor 23 combination coact with resistors 18, 19 and 20 to form a phase shift circuit. The output, taken between the variable tap 21 on resistor 19 and the junction between resistor 22 and capacitor 23, is phase shifted approximately 90° from the phasing voltage appearing across the varistors 24 and 25. The variable tap 21 on resistor 19 allows a variation of the phase shift which takes place and therefore permits adaptation of the circuit to various network systems which require different methods of operation due to the type of loading.

The output of the phase shift circuit is connected to the primary windings 29 and 30 of transformers 31 and 32. The transformers 33 and 34 have their primary windings 37 and 38 energized by the measure of the phase to neutral voltage which appears across resistor 10. The four transformers 31, 32, 33 and 34 have their secondary windings 39, 40, 41 and 42 connected in a center tapped series circuit to feed a pair of half wave rectifiers 44 and 45. Windings 39 and 40 feed rectifier 44 and windings 41 and 42 feed rectifier 45. The direct current output of rectifiers 44 and 45 appears across resistors 35, 46 and 47. Capacitors 51 and 52, connected from the output side of the rectifiers to the center tap 43, provide a filtering action on the pulsating direct current output of the rectifiers.

Figure 3:
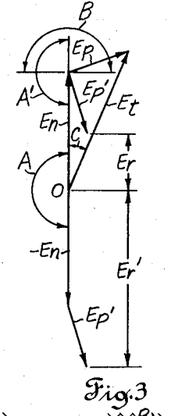
Fig. 3 is a vector diagram illustrating the vector relationship between the transformer voltage and the network voltage which does not permit the circuit breaker to close.

The connection of these four transformers 31, 32, 33 and 34 is best explained with reference to Fig. 3. Vector $E_n$ represents the voltage to neutral of one phase of the network and appears across resistor 10. $E_t$ represents the voltage to neutral of the same phase on the transformer side of the breaker 15. It will be seen from Fig. 1 that the phase shift circuit and the series resistor 17 are energized by the phasing voltage which is the difference between the voltage on the transformer side of the breaker and the voltage on the network side. In Fig. 3, this voltage is shown as $E_p$.

Figure 2:
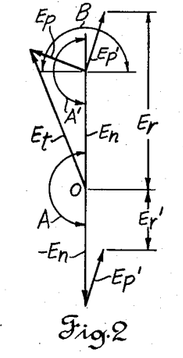
Fig. 2 is a vector diagram illustrating the vector relationship between the transformer voltage and the network voltage which permits the circuit breaker to close.

In Fig. 2, the transformer voltage has been represented as slightly leading the network voltage. This will be the usual case. However, it is also possible that the reverse condition will exist and the transformer voltage will lag the network voltage. It may also be that the two voltages are identical such as when the circuit breaker is closed.

The phase shift circuit rotates the vector $E_p$ approximately 90°, depending on the setting of the tap 21 on variable resistor 19, to produce a voltage $E_p'$ as shown in Fig. 3.

It is this voltage $E_p'$ which energizes the primary windings 29 and 30 of the transformers 31 and 32. The other transformers 33 and 34 have their primary windings 37 and 38 energized by a measure of the phase A to neutral network voltage $E_n$ which appears across resistor 10. The secondary windings 39 and 40 of the transformers 31 and 33 are series connected so that the vector sum of $E_n$ and $E_p'$ appears across the extremities of the two windings 39 and 40 between rectifier 44 and center tap 43. The secondary windings 41 and 42 of the other two transformers 32 and 34 are connected so that the vector difference between $E_n$ and $E_p'$ appears across the extremities of the windings between rectifier 45 and center tap 43.

Thus, rectifier 45 is energized with the vector resultant of $E_p' - E_n$ and rectifier 44 is energized with the vector resultant of $E_p' + E_n$. The direct current output voltage from rectifier 44 will be essentially the peak value of $E_p' + E_n$ since capacitor 51 charges to this value due to the relatively high impedance of the load circuit. Similarly the direct current output voltage from rectifier 45 will charge capacitor 52 to essentially the peak value of the $E_p' - E_n$ for the same reason. However, the varistors 49 and 50 across the secondary winding 42 of the transformer 32 limit the voltage across this winding.

In normal operation, the difference in voltage $E_p$ between the network and the transformer will be relatively small. Should the network be energized, the network voltage would be substantially the same as the transformer voltage. In the event the network voltage $E_n$ is zero, it will be seen that the value of $E_p$ will be equal to $E_t$. The transformers 31 and 32 will receive equal voltage to the primary windings 29 and 30 since these windings are connected in parallel and are energized by $E_p'$. There is no voltage across the primary windings 37 and 38 of transformers 33 and 34 when the network voltage is zero.

This condition would normally result in zero output voltage across the load resistor 47 and the tapped portion of resistor 46, since the rectifiers 44 and 45 are connected in opposition and the tap divides resistor 46 in the same ratio as the values of resistance of resistors 35 and 47. However, the varistors 49 and 50 across the secondary winding 42 of the transformer 32 limits the maximum voltage which may appear across this winding to a value above that produced for the normal values of $E_n$ but below that which is induced when the network voltage is zero.

The phasing voltage has to be far above normal values to have this limitation take effect so limiting occurs only during the period when the network voltage is zero or very nearly so. Assuming that the phasing voltage does become quite high, it is first limited by the varistors 24 and 25. This is to avoid overloading the phase shift circuit. The phase shifted output is then fed to primary windings 29 and 30 of the transformers 31 and 32. The varistors 49 and 50 across the secondary winding 42 of the transformer 32 limit the voltage which feeds the rectifier 45. There is no such limitation on the voltage across the secondary winding 39 of transformer 31 which feeds rectifier 44. Therefore, providing the voltage across each of the secondary windings 39 and 42 exceeds the value at which the limiting effect of the varistors 49 and 50 takes place, the rectified output of rectifier 44 will exceed the output of rectifier 45 and a positive output voltage will be obtained across the resistors 47 and the portion of resistor 46 included by the variable tap 48. This variable tap provides an adjustment to locate the point at which the output of rectifier 44 balances the output of rectifier 45 for a given input.

Looking once again at Fig. 2, it will be observed that the peak value of $E_r$, which represents the peak or rectified value of the vector sum of $E_p' + E_n$, will always be greater than $E_r'$, which represents the peak or rectified value of the vector difference of $E_p' - E_n'$, as long as the vector $E_t$ is within the angle designated A. This is true since $E_p$ must lie within the angle A'; therefore $E_p'$, which is shifted 90° from $E_p$, lies somewhere above the terminal point of $E_n$ within the angle B and must increase the peak value of $E_r$ over $E_n$ and decrease the peak value of $E_r'$ under $-E_n$. The direct current output voltage of the rectifier 44 will exceed the direct current output voltage of the rectifier 45 and a positive output voltage will be obtained across the resistor 47 and the tapped portion of resistor 46.

Summarizing in another manner, as long as the vector $E_p$, representing the voltage input to the phase shift circuit, lies to the left of a boundary line along $E_n$, the output $E_p'$ of this circuit will be a vector above a boundary line passing through the tip of $E_n$. This follows since the amount of phase shift is 90°. It will be remembered that the phase shift circuit is adjustable to obtain a variable amount of phase shift so that the input to the phase shift circuit could be anywhere to the left of a boundary line that may be rotated about the tip of $E_n$ to the left or right of the vertical. If the line were so rotated, by changing the tap 21 to vary the phase shift obtained, the input to the phase shift circuit could still produce a positive output voltage across the resistors 35, 46 and 47 even though the transformer voltage lags the network voltage.

The discussion thus far has covered only the case where the transformer voltage lies within the area which allows the breaker to close. In the event the transformer voltage lags the network voltage by a significant amount the breaker should remain open. This condition is shown in Fig. 3.

The transformer voltage may be seen to lag the network voltage by the angle C. $E_p$ lies outside of the limits shown by angle A' in Fig. 2 and $E_p'$ is outside the angle B. Therefore, $E_p'$ subtracts from the peak value of $E_n$. The peak value of $E_p' - E_n$ $E_r'$, exceeds the peak value of $E_p' + E_n$ which is $E_r$. This means that the peak alternating voltage input to rectifier 44 will be less than the peak alternating voltage input to rectifier 45 and the direct current output voltage across resistors 46 and 47 will be of a negative polarity.

In the foregoing manner, a positive output is obtained when the network voltage $E_n$ lags behind the transformer voltage $E_t$, thereby establishing a boundary for $E_t$ which passes through $E_n$. There is also the condition that the inphase component of $E_t$ should exceed $E_n$ so a second portion of the circuit establishes a boundary which passes through the tip of $E_n$ and is perpendicular to $E_n$.

The voltage across the resistor 10 energizes the primary windings 53 and 54 of the two transformers 55 and 56 giving them a measure of the voltage of phase A to neutral. The primary windings 53 and 54 of the transformers 55 and 56 are connected in parallel so that each transformer receives a measure of the phase A to neutral voltage. In a similar manner, the transformers 57 and 58 have their primary windings 59 and 60 connected in parallel so that each recieves a measure of the phasing voltage $E_p$ which appears across the resistors 17, 18, 19 and 20.

Figure 4:
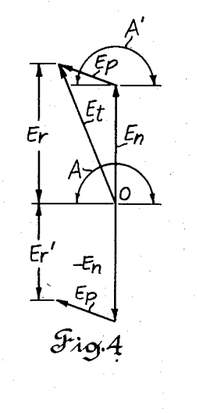
Fig. 4 is a schematic vector diagram illustrating the vector relationship between the transformer voltage and the network voltage which permits the circuit breaker to close.

In Fig. 4, the voltage energizing the primary windings 53 and 54 of transformers 55 and 56 is indicated by the vector $E_n$. The other transformers 57 and 58 in the combination of four have their primary windings 59 and 60 connected in parallel and are energized by the phasing voltage which is the difference between $E_n$ and $E_t$. In the vector diagram of Fig. 4 this voltage is indicated as $E_p$. The windings are so combined to produce across the series connected secondaries 62 and 63 the peak value of the vector sum $E_p+E_n$ which is represented by $E_r$ in Fig. 4. Rectifier 67 is energized by this voltage $E_r$.

The rectifier 68 is energized by the voltage across series connected secondaries 64 and 65. This voltage is represented as $E_r'$ in Fig. 4 and is the peak value of the vector difference between $E_p$ and $E_n$. The output of the half wave rectifiers 67 and 68 is a pulsating direct current. Filter capacitors 69 and 70 connected from the output of the rectifiers to the center tap 66 have been added. The filter capacitors rapidly charge to the peak value of the pulsating direct current and remain substantially at that point between cycles. Resistor 74 is connected from the output of the rectifier 67 to the center tap 66 and resistors 75 and 76 are connected from the output of rectifier 68 to the center tap 66.

With reference to Fig. 4 it is easily seen that the peak value of $E_r$ will always be greater than $E_r'$ as long as the vector $E_t$ is within the angle A so the inphase component of $E_t$ exceeds the value of $E_n$. Putting it another way, the peak value of $E_r$ will be greater than $E_r'$ when the vector $E_p$, the phasing voltage, lies within the angle $A'$. When $E_p$ increases the value of $E_r$ over $E_n$ the condition exists whereby $E_r$ is greater than $E_r'$. From Figs. 4 and 5, it is obvious than when $E_p$ increases $E_r$ over $E_n$ it also decreases $E_r'$ under the value of $-E_n$.

The operation of this portion of the circuit produces the other boundary for the vector representing the transformer voltage. The portion of the circuit described thus far defines two boundary conditions for the vector representing the transformer voltage, the first being that the transformer voltage must be leading the network voltage and the second being that the inphase component of the transformer voltage must exceed the peak value of the network voltage. Another way of saying this is that the vector representing transformer voltage must terminate within the area defined by the radii of the second quadrant of a circle having its center at the tip of the vector $E_n$.

Standard network requirements require that the circuit breaker be closed when the network voltage is zero, however, when the voltage on the network side drops to zero primary windings 53 and 54 of transformers 55 and 56 will not receive any current because the voltage across resistor 10 will be zero. That is to say, the voltage across the primary windings 53 and 54 will be zero. Since the other two transformers 57 and 58 have their primary windings 59 and 60 energized in parallel, the voltages appearing across the secondary on each side of the center tap 66 will be equal and therefore the voltage across resistor 74 will equal that across resistors 75 and 76, producing no output across resistor 75 and the portion of resistor 74 included by tap 79. Since, as will be pointed out later, a positive output voltage must be obtained from this circuit if the circuit breaker is to be closed, it is necessary to devise some means for providing this output when the network voltage is zero. This is done by means of the varistors 77 and 78 connected across the secondary winding 65 of the transformer 58 to limit the voltage in the same manner as with winding 42 of transformer 32. When the phasing voltage $E_p$ becomes quite large, the voltage across the secondary windings 62 and 65 of the transformers 57 and 58 will also become quite large, exceeding the point at which the limiting effect of varistors 77 and 78 takes place. This means that the total voltage across the windings 64 and 65 on the lower side of the center tap will be substantially smaller than the total voltage across the windings 62 and 63 on the upper side of the center tap due to the limiting effect of the varistors. The direct current output produced by rectifier 67 will therefore be greater than the direct current output produced by rectifier 68. Since these two direct current outputs are connected in opposition it follows that the output across the resistor 75 to the variable tap 79 on resistor 74 will also be of a positive nature. This pulsating direct current is filtered by the capacitors 69 and 70. Since additional filtering is needed the filter capacitor 82 and choke 83 are used.

Similarly, the first transformer combination has its output filtered by means of a filter capacitor 84 and choke 85.

A power transformer 88 has its primary winding 89 energized by the phase to neutral voltage on the transformer side of the breaker. This insures that the transformer will receive energy at all times when it is desired to close the breaker. A secondary winding 90 of this transformer is connected to an output circuit through a series of transistor switches.

The first transistor 93 of the PNP junction type has its base 94 connected to the junction of resistor 35 and resistor 47 through an impedance in the form of filter choke 85. The emitter 95 of transistor 93 has a connection leading to the secondary winding 90 of power transformer 88. Another lead runs from the emitter 95 to the variable tap 48 on resistor 46. Connected between the emitter 95 and the base 94 is a capacitor 96 which provides a filtering action and also coacts with the impedance 85 to provide a time delay to the switching action.

It is a property of a PNP junction transistor that the emitter 95 to collector 97 resistance is very high when the base 94 is biased negatively with respect to the emitter 95. The resistance in the reverse, or collector to emitter direction, is low under this condition. To avoid the necessity for two transistors in each switch a diode 98 is included in the circuit to block the reverse cycle of alternating current. If it were not for this diode the reversal of polarity of the voltage across winding 90 would result in conduction through the transistor in the reverse direction and complete cutoff of collector emitter current would be impossible.

A similar PNP junction transistor 100 has the base 101 connected to the point common to resistors 75 and 76 and the emitter 102 connected to the variable tap 79 on resistor 74. The emitter 102 and collector 103 are in series with the circuit to be controlled. A capacitor 104 connected between the emitter 102 and the base 101 provides a filtering action on the control voltage and coacts with impedance 83 to produce a time delay. Although capacitor 104 is not essential to successful operation of the device, it appears that the addition of the capacitor greatly improves the action of the transistor switch. The reason for such improvement is not entirely clear and may be related to the fact that the transistors are not used as amplifiers in the ordinary sense but are either in a conducting state or a nonconducting state. This mode of operation greatly increases the current rating of the transistor since there is very little energy dissipated within the transistor itself. Each switch is responsive to the position of the vector $E_t$ with respect to a boundary. The boundaries define an area in which the vector $E_n$ must terminate if both switches are to be closed. In the case of the first transistor switch conduction through the switch of a pulsating direct current will take place when, as shown in Fig. 2 $E_r$ is greater than $E_r'$ causing the emitter to be biased positively with respect to the base. In a similar manner conduction through the second transistor of a pulsating direct current will take place when, as shown in Fig. 4, $E_r$ is greater than $E_r'$ causing the emitter to be biased positively with respect to the base. A filter capacitor 105 connected across the output of the transistor switch circuit and the power transformer serves to filter the pulsating direct current.

It will be observed that this description relates to a three phase circuit and also that the circuits involving protection of the three phases are similar. The elements associated with phase B are identified with the same number as the counterpart associated with phase A, plus the letter b. Similarly, the elements associated with phase C are identified with the same number as the counterpart associated with phase A plus the letter c. Since the only difference between the three circuits is the point of connection to the network and transformer sides of the breaker, only the phase A portion has been described in detail.

Each of the protective circuits has its connection to its respective phase conductor. For example, resistors 11 and 12 measure phase B with the voltage across resistor 12 as a measure of the phase B to neutral voltage. Resistors 13 and 14 measure phase C with the voltage across resistor 14 as a measure of the phase C to neutral voltage. The connections for the phasing voltage for phase B is made between conductors 2 and 5. In a similar manner, the phasing voltage for phase C is measured between conductors 3 and 6.

The outputs of the respective phase protective circuits may be connected in series connected relays with the circuit breaker closing circuit, in which case the breaker will not close unless the proper closing conditions are met on all three phases, or the outputs may be connected in a parallel circuit relationship with each other whereby a closing condition for any one phase will permit a closing of the circuit breaker. In the embodiment shown and described, the outputs of these three circuits are in series with the circuit so that a satisfactory closing condition must be had in all three phases in order to close the breaker.

Each distribution network presents its own particular problem of protection since the method of operation varies with the electrical characteristics of the network. For example, a regenerative load near a distribution point may cause a phase shift that would indicate a damaging condition on another network but is not abnormal to the particular network. The network protector should be easily adjusted to take care of these varying conditions of operation between networks and even between phases on the same network.

Figs. 7 through 13 illustrate the various adjustments which may be made to permit the network to be operated in the proper manner as determined by its electrical characteristics. These adjustments are made through the tap 21 of the phase shift circuit, the tap 48 on resistor 46 and the tap 79 on resistor 74.

In these diagrams vector $E_n$, representing the network voltage, is taken as the reference with the direction of rotation being counterclockwise. For example, a vector starting at zero voltage, represented by 0, and terminating to the left of the vector $E_n$, would be leading the network voltage. Thus, the area which includes all vectors leading the vector $E_n$ is represented by the shaded area to the left of a line along the vector $E_n$.

When the tap 21 is adjusted to produce a 90° phase shift of the phasing voltage $E_p$, a positive output voltage will be impressed across the transistor 93 as long as the vector representing the transformer voltage lies within the shaded area.

Figure 7:
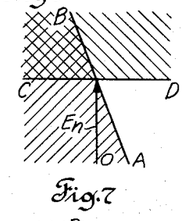

In Fig. 7 the tap 21 has been moved so that the phase shift is greater than 90°. In this case the vector representing the transformer voltage still must lie within the shaded area to produce a positive output voltage but it will be noticed that the boundary of the shaded area has been altered. Instead of lying along a line through $E_n$, the boundary passes through only the tip of vector $E_n$ and is at an angle with $E_n$ so that certain vectors leading $E_n$ no longer produce a positive output voltage across the emitter base circuit transistor 93.

Figure 8:
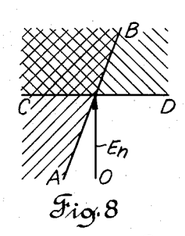

Fig. 8 shows the effect of changing tap 21 so that the phase shift of $E_p$ is less than 90°. In this case the area in which the vector $E_t$ may lie for a positive voltage across transistor 93 includes certain vectors which are lagging the voltage $E_n$.

In addition to the phase relationship that must be satisfied, the magnitude of $E_t$ must exceed a minimum value, which value varies with the phase of $E_t$.

Figure 5:
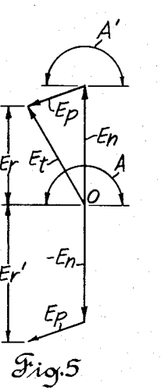
Fig. 5 is a schematic vector diagram illustrating the vector relationship between the transformer voltage and the network voltage which does not permit the circuit breaker to close.
Figure 6:
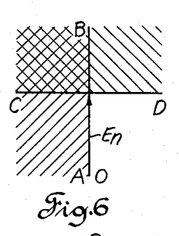
Figs. 6 through 14 are diagrams which show the various adjustments of the vector relationship which permit the breaker to close.

With reference to Figs. 4 and 5, it will be seen that a positive voltage is impressed across the emitter base circuit of transistor 100 when $E_r$ is larger than $E_r'$. The variable tap 79 on resistor 74 determines the portion of $E_r$ which is balanced against $E_r'$. If the tap 79 divides resistor 74 in the same ratio as resistors 75 and 76, $E_r$ will balance an equal value of $E_r'$ and $E_r$ need exceed $E_r'$ only slightly to produce the positive voltage necessary for conduction in transistor 100. In this case the vector $E_t$ must terminate above the line perpendicular to $E_n$ and passing through the terminal point of $E_n$ to produce the positive voltage across the emitter base circuit of transistor 100. This condition is shown in Figs. 6, 7 and 8. The line CD represents the minimum value of $E_t$ which will produce a conductive condition in transistor 100. In other words, a vector representing the transformer voltage must terminate in the area above the line CD to close the transistor switch 100. The closer $E_t$ matches the phase of $E_n$ the less it must exceed $E_n$ to produce a positive output voltage but as the phase angle widens, $E_t$ must become larger and larger to terminate in the area above the line CD.

In Figs. 6, 7 and 8 the cross hatch represents the area in which the $E_t$ vector must terminate if the transistor switches 93 and 100 are to both conduct.

Figure 9:
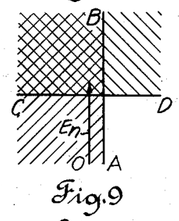
Figure 10:
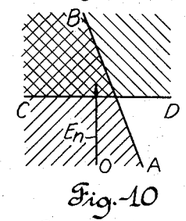
Figure 11:
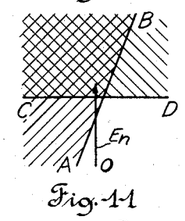

Figs. 9, 10 and 11 represent another adjustment of the circuit. It will be observed that the line CD falls below the terminal point of the vector $E_n$. This means that $E_r'$ is balanced by a value of $E_r$ which is less than $E_r'$. This may be accomplished by moving the tap 79 so that it is further from center tap 66 than for the condition shown in Figs. 6, 7 and 8. In this manner, a greater portion of the voltage across resistor 74 is balanced against the voltage across resistor 75.

Figure 12:
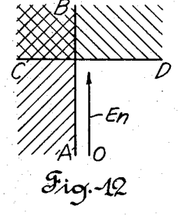
Figure 13:
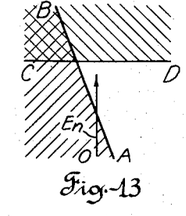
Figure 14:
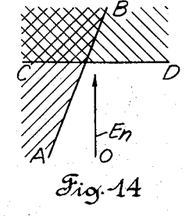

When the tap 79 is close to the center tap 66, the condition exists as shown in Figs. 12, 13 and 14. Here the line CD is above the terminal point of the vector $E_n$ so $E_t$ must be greater than $E_n$ even when the two voltages are exactly in phase. With the tap 79 near the center tap 66 only a small portion of the output of rectifier 67 is used to balance the voltage across resistor 75 so the voltage across the tapped portion of resistor 74 will predominate over the voltage across resistor 75 only when the rectified value of the vector sum of $E_p$ and $E_n$ is substantially greater than the rectified value of the vector sum of $E_p$ and $-E_n$.

In Figs. 9 through 14, it will be observed that the boundary AB does not lie along the vector $E_n$. The amount and direction of the displacement depends on the setting of the variable tap on resistor 46. With reference to Figs. 6, 7 and 8 the voltage $E_r$ is developed across resistor 46 and $E_r'$ is developed across resistor 47. If a reduced portion of $E_r$ is tapped off the resistor 46 a condition of balance will exist only when $E_r$ is greater than $E_r'$ by the same ratio that represents the reduced value of $E_r$ in relation to the full value of $E_r$. In the case where the tap 48 is moved close to the transformer center tap 43 a condition exists similar to that shown in Figs. 12, 13 and 14. Here the vector $E_t$ must terminate in the area to the left of the boundary line AB just as in the case of Figs. 6, 7 and 8. However, in this case the boundary has been moved to the left of the vector $E_n$. This makes the phase and magnitude requirements more strict than the case shown in Figs. 6, 7 and 8.

In a somewhat similar manner, the conditions shown in Figs. 9, 10 and 11 may be produced with the adjustment of tap 48 to include a greater portion of the resistance of resistor 46 than ratio of the value of resistor 47 to that of resistor 35. In this manner a vector relationship such as shown in Fig. 3 could produce a closure signal to the breaker. When the tap 48 is moved away from the center tap it is the same as increasing the effectiveness of a given value of $E_r$ in balancing $E_r'$. Or putting it another way, a larger portion of $E_r$ is balanced against $E_r'$. This enlarges the area which permits closure of the breaker as shown by displacement of the boundary line AB to the right of the vector $E_n$.

These adjustments permit adaptation of the network protector to close the breaker for a wide variety of phase and magnitude relationships between $E_r$ and $E_t$.

The effect of harmonic voltages, a serious drawback to the mechanical or relay type of network protector has been eliminated through the connection of the transformers 31—34 and 55—58. Since the harmonic voltages are equal on both sides of the transformer, they contribute equally to the voltages produced on the secondary side feeding both rectifiers. With the outputs of the rectifiers connected in opposition, the rectified harmonic voltages will cancel themselves out.

In summary, this invention provides a circuit breaker closing control which responds to the combination of a first signal, responsive to the phase angle between the network voltage and the transformer voltage and produced through a given range of phase angle difference, and a second signal, responsive to the inphase component of the transformer voltage and produced when the inphase component of the transformer voltage lies within the range which exceeds the peak value of the network voltage.

What is claimed is:

1. In an alternating current system having first and second alternating voltages, means for producing a first output voltage over a first predetermined range of vector relationships between said voltages, means for producing a second output voltage for a second predetermined range of vector relationships between said voltages, circuit breaker closure means responsive to said first and second output voltages only when the first and second alternating current voltages lie within the range common to said first and second predetermined range of vector relationships.

2. In a system having first and second alternating voltages, means for producing a third alternating voltage responsive in phase to the vector difference between said first and second voltages but displaced in phase by a predetermined amount from said vector difference, means for producing an output voltage responsive to the arithmetic difference between first and second resultant voltages, said first resultant being responsive to the vector sum of said first and the third alternating voltages, said second resultant being responsive to the vector difference between said first and the third alternating voltages.

3. In a system having first and second alternating voltages, means for producing a third alternating voltage responsive in phase to the vector difference between said first and second voltages but displaced in phase by a predetermined amount from said vector difference, means for producing a first direct current output voltage responsive to the arithmetic difference between first and second resultant voltages, said first resultant being responsive to the peak value of the vector sum of said first and third alternating voltages, said second resultant being responsive to the peak value of the vector difference between said first and third alternating voltages, means for producing said first direct current output voltage when said first alternating voltage is zero.

4. In a system having first and second alternating voltages, means for producing a third alternating voltage responsive in phase to the vector difference between said first and second voltages but displaced in phase by a predetermined amount from said vector difference, means for producing a first direct current output voltage responsive to the arithmetic difference between first and second resultant voltages, said first resultant being responsive to the peak value of the vector sum of said first and third alternating voltages, said second resultant being responsive to the peak value of the vector difference between said first and the third alternating voltages, means for producing a second direct current output voltage responsive to the arithmetic difference between third and fourth resultant voltages, said third resultant voltage being responsive to the peak value of the vector sum of said first alternating voltage and a voltage responsive to the vector difference between said first and second alternating voltages, said fourth resultant voltage being responsive to the peak value of the vector difference between said first alternating voltage and a voltage responsive to the vector difference between said first and second alternating voltages, control means responsive to said first and second direct current output voltages.

5. In a system having first and second alternating voltages, means for producing a third alternating voltage responsive in phase to the vector difference between said first and second voltages but displaced in phase by a predetermined amount from said vector difference, means for producing a first direct current output voltage responsive to the arithmetic difference between first and second resultant voltages, said first resultant being responsive to the peak value of the vector sum of said first and third alternating voltages, said second resultant being responsive to the peak value of vector difference between said first and third alternating voltages, means for producing a first direct current output voltage when the value of said third alternating voltage approaches the value of said second alternating voltage, means for producing a second direct current output voltage responsive to the arithmetic difference between third and fourth resultant voltages, said third resultant voltage being responsive to the peak value of the vector sum of said first alternating voltage and the difference between said first and second alternating voltages, said fourth resultant voltage being responsive to the peak value of the vector difference between said first alternating voltage and a voltage responsive to the vector difference between said first and second alternating voltages, control means responsive to said first and second direct current output voltages.

6. In a system having first and second alternating voltages, means for producing a third alternating voltage responsive in phase to the vector difference between said first and second voltages, means for producing an output voltage responsive to the arithmetic difference between first and second resultant voltages, said first resultant being responsive to the vector sum of said first and third alternating voltages, said second resultant being responsive to the vector difference between said first and third alternating voltages.

7. In a system having first and second alternating voltages, means for producing a third alternating voltage responsive in phase to the vector difference between said first and second voltages, means for producing a first direct current output voltage responsive to the arithmetic difference between first and second resultant voltages, said first resultant being responsive to the peak value of the vector sum of said first and third alternating voltages, said second resultant being responsive to the peak value of the vector difference between said first and third alternating voltages, means for producing a first direct current output voltage when said first alternating voltage is zero.

8. In a system having first and second alternating voltages, means for producing a third alternating voltage responsive in phase to the vector difference between said first and second voltages, means for producing a first direct current output voltage responsive to the arithmetic difference between first and second resultant voltages, said first resultant being responsive to the peak value of the vector sum of said first and third alternating voltages, said second resultant being responsive to the peak value of the vector difference between said first and third alternating voltages, means for producing a second direct current output voltage responsive to the arithmetic difference between third and fourth resultant voltages, said third resultant voltage being responsive to the peak value of the vector sum of said first alternating voltage and a fifth voltage responsive to the vector difference between said first and second alternating voltages but shifted in phase, said fourth resultant voltage being responsive to the peak value of the vector difference between said first alternating voltage and said fifth voltage, control means responsive to said first and second direct current output voltages.

9. In a system having first and second alternating voltages, means for producing a third alternating voltage responsive in phase to the vector difference between said first and second voltages, means for producing a first direct current output voltage responsive to the arithmetic difference between first and second resultant voltages, said first resultant being responsive to the peak value of the vector sum of said first and third alternating voltages, said second resultant being responsive to the peak value of the vector difference between said first and third alternating voltages, means for producing a first direct current output voltage when the value of said third alternating voltage approaches the value of said second alternating voltage, means for producing a second direct current output voltage responsive to the arithmetic difference between third and fourth resultant voltages, said third resultant voltage being responsive to the peak value of the vector sum of said first alternating voltage and a fifth voltage responsive to the vector difference between said first and second alternating voltages but shifted in phase, said fourth resultant voltage being responsive to the peak value of the vector difference between said first alternating voltage and said fifth voltage, control means responsive to said first and second direct current output voltages.

10. In a system having first and second alternating voltages, means for producing a third alternating voltage responsive in phase to the vector difference between said first and second alternating voltages, means for producing a first direct current output voltage responsive to the arithmetic difference between first and second resultant voltages, said first resultant voltage being responsive to the peak value of the vector sum of said first and third alternating voltages, said second resultant voltage being responsive to the peak value of the vector difference between said first and third alternating voltages, means for shifting the phase of said third voltage to produce a phase shifted third voltage, means for producing a second direct current output voltage responsive to the arithmetic difference between third and fourth resultant voltages, said third resultant voltage being responsive to the peak value of the vector sum of said first alternating voltage and said phase shifted third voltage, said fourth resultant voltage being responsive to the peak value of the vector difference between said first alternating voltage and said phase shifted third voltage, control means responsive to said first and second direct current output voltages.

11. In a system having first and second alternating voltages, means for producing a third alternating voltage responsive in phase to the vector difference between said first and second alternating voltages, a first pair of transformers each having primary and secondary windings, means connecting the primary windings of said first pair of transformers in parallel circuit relation to be energized by a measure of said first alternating voltage, a second pair of transformers each having primary and secondary windings, means connecting the primary windings of said second pair of transformers in parallel circuit relation to be energized by a voltage proportional to said third voltage but displaced in phase from said third voltage, means connecting a first pair of said secondary windings to produce a sum voltage proportional to the vector sum of the voltages energizing the primary windings of said first and second pair of transformers, means connecting a second pair of said secondary windings to produce a different voltage proportional to the vector difference between the voltages energizing the primary windings of said first and second pair of transformers, rectifier means for converting said sum and difference voltages to a first signal voltage responsive to the arithmetic difference between the peak values of said sum and difference voltages, means for producing a second signal voltage proportional to the arithmetic difference between first and second resultant voltages, said first resultant voltage being responsive to the peak value of the vector sum of the first and third alternating voltages, said second resultant voltage being responsive to the peak value of the vector difference between said first and third alternating voltages.

12. In a system having first and second alternating voltages, means for producing a third alternating voltage responsive in phase to the vector difference between said first and second alternating voltages, a first pair of transformers each having primary and secondary windings, means connecting the primary windings of said first pair of transformers in parallel circuit relation to be energized by a measure of said first alternating voltage, a second pair of transformers each having primary and secondary windings, means connecting the primary windings of said second pair of transformers in parallel circuit relation to be energized by a measure of said third voltage, means connecting a first pair of said secondary windings to produce a sum voltage proportional to the vector sum of the voltages energizing the primary windings of said first and second pair of transformers, means connecting a second pair of said secondary windings to produce a difference voltage proportional to the vector difference between the voltage energizing the primary windings of said first and second pair of transformers, rectifier means for converting said sum and difference voltages to a first signal voltage responsive to the arithmetic difference between the voltages energizing the primary windings of said means for producing a second signal voltage proportional to the arithmetic difference between first and second resultant voltages, said first resultant voltage being responsive to the peak value of the vector sum of said first alternating voltage and a voltage proportional to, but displaced in phase from, said third voltage, said second resultant voltage being responsive to the peak value of the vector difference between said first alternating voltage and a voltage proportional to, but displaced in phase from, said third voltage, control means responsive to said first and second signal voltages.

13. In a system having first and second alternating voltages, means for producing a third alternating voltage responsive in phase to the vector difference between said first and second alternating voltages, a first pair of transformers each having primary and secondary windings, means connecting the primary windings of said first pair of transformers in parallel circuit relation to be energized by a measure of said first alternating voltage, a second pair of transformers each having primary and secondary windings, means connecting the primary windings of said second pair of transformers in parallel circuit relation to be energized by said third voltage, means connecting a first pair of said secondary windings to produce a sum voltage proportional to the vector sum of the voltages energizing the primary windings of said first and second pair of transformers, means connecting a second pair of said secondary windings to produce a difference voltage proportional to the vector difference between the voltages energizing the primary windings of said first and second pair of transformers, voltage limit means associated with one of said first and second pair of transformers for limiting the voltage across the secondary winding when the value of said third voltage approaches the value of said second voltage, rectifier means for converting said sum and difference voltages into a first signal voltage responsive to the arithmetic difference between the peak values of said sum and difference voltages, a third pair of transformers each having primary and secondary windings, means connecting the primary windings of said third pair of transformers in parallel circuit relation to be energized by a measure of the first voltage, a fourth pair of transformers each having primary and secondary windings, means connecting the primary windings of said fourth pair of transformers in parallel circuit relation to be energized by a fourth voltage responsive in phase to the vector difference between said first and second alternating voltages but displaced in phase by a predetermined amount from said vector difference, a third pair of secondary windings on said third and fourth transformer pairs, means connecting said third pair of windings to produce a second sum voltage proportional to the vector sum of the voltages energizing the primary windings of said third and fourth pair of transformers, a fourth pair of secondary windings on said third and fourth transformer pairs, means connecting said fourth pair of windings to produce a second difference voltage proportional to the vector difference of the voltages energizing the primary windings of said third and fourth pairs of transformers, voltage limit means associated with one of said third and fourth pair of transformers for limiting the voltage across the secondary winding when the value of said third voltage approaches the value of said second voltage, second rectifier means for converting said second sum and difference voltages to a second signal voltage responsive to the arithmetic difference between the peak values of said second sum and difference voltages, control means responsive to said first and second signal voltages.

14. In a system having first and second alternating voltages, means for producing a third alternating voltage responsive in phase to the vector difference between said first and second voltages but displaced in phase by a predetermined amount from said vector difference, means for producing a first direct current voltage proportional to the peak value of the vector sum of said first and third alternating voltages, means for producing a second direct current voltage proportional to the peak value of the vector difference between said first and third alternating voltages, resistor means, means connecting said resistor means to be energized by said first and second direct current voltages, means connected to said resistor means for picking off a direct current output voltage responsive to the relative values of said first and second direct current voltages.

15. In a system having first and second alternating voltages, means for producing a third alternating voltage responsive in phase to the vector difference between said first and second voltages but displaced in phase by a predetermined amount from said vector difference, means for producing a first direct current voltage proportional to the peak value of the vector sum of said first and third alternating voltages, means for producing a second direct current voltage proportional to the peak value of the vector difference between said first and third alternating voltages, resistor means, means connecting said resistor means to be energized by said first and second direct current voltages, means connected to said resistor means for picking off a direct current output voltage responsive to the relative values of said first and second direct current voltages, means for producing a first direct current output voltage when the value of said third alternating voltage approaches the value of said second alternating voltage.

16. In a system having first and second alternating voltages, means for producing a third alternating voltage responsive in phase to the vector difference between said first and second voltages but displaced in phase by a predetermined amount from said vector difference, means for producing a first direct current voltage proportional to the peak value of the vector sum of said first and third alternating voltages, means for producing a second direct current voltage proportional to the vector difference between said first and third alternating voltages, resistor means, means connecting said resistor means to be energized by said first and second direct current voltages, variable tap means on said resistor means for picking off a direct current output voltage responsive to the relative value of said first and second direct current voltages.

17. In a system having first and second alternating voltages, means for producing a third alternating voltage responsive in phase to the vector difference between said first and second voltages but displaced in phase by a predetermined amount from said vector difference, means for producing a first direct current voltage proportional to the peak value of the vector sum of said first and third alternating voltages, means for producing a second direct current voltage proportional to the peak value of the vector difference between said first and third alternating voltages, resistor means, means connecting said resistor means to tbe energized by said first and second direct current voltages, variable tap means on said resistor means for picking off a direct current output voltage responsive to the relative values of said first and second direct current voltages, means for producing a direct current voltage when the value of said third alternating voltage approaches the value of said second alternating voltage.

18. In a system having first and second alternating voltages, means for producing a third alternating voltage responsive in phase to the vector difference between said first and second voltages, means for producing a first direct current voltage proportional to the peak value of the vector sum of said first and third alternating voltages, means for producing a second direct current voltage proportional to the peak value of the vector difference between said first and third alternating voltages, resistor means, means connecting said resistor means to be energized by said first and second direct current voltages, means connected to said resistor means for picking off a direct current output voltage responsive to the relative values of said first and second direct current voltages.

19. In a system having first and second alternating voltages, means for producing a third alternating voltage responsive in phase to the vector difference between said first and second voltages, means for producing a first direct current voltage proportional to the peak value of the vector sum of said first and third alternating voltages, means for producing a second direct current voltage proportional to the peak value of the vector difference between said first and third alternating voltages, resistor means, means connetcing said resistor means to be energized by said first and second direct current voltages, means connected to said resistor means for picking off a direct current output voltage responsive to the relative values of said first and second direct current voltages, means for producing a direct current output voltage when the value of said third alternating voltage approaches the value of said second alternating voltage.

20. In a system having first and second alternating voltages, means for producing a third alternating voltage responsive in phase to the vector difference between said first and second voltages, means for producing a first direct current voltage proportional to the peak value of the vector sum of said first and third alternating voltages, means for producing a second direct current voltage proportional to the peak value of the vector difference between said first and third alternating voltages, resistor means, means connecting said resistor means to be energized by said first and second direct current voltages, variable tap means connected to said resistor means for picking off a direct current output voltage responsive to the relative values of said first and second direct current voltages.

21. In a system having first and second alternating voltages, means for producing a third alternating voltage responsive in phase to the vector difference between said first and second voltages, means for producing a first direct current voltage proportional to the peak value of the vector sum of said first and third alternating voltages, means for producing a second direct current voltage proportional to the peak value of the vector difference between said first and third alternating voltages, resistor means, means connecting said resistor means to be energized by said first and second direct current voltages, variable tap means connected to said resistor means for picking off a direct current output voltage responsive to the relative values of said first and second direct current voltages, means for producing a direct current output voltage when the value of said third alternating voltage approaches the value of said second alternating voltage.

22. In a control for a circuit breaker connecting a first alternating current system having a first alternating voltage to a second alternating current system having a second alternating voltage, means for producing a third alternating voltage responsive in phase to the vector difference between said first and second alternating voltages, means for producing a first direct current output voltage responsive to the arithmetic difference between first and second resultant voltages, said first resultant voltage being responsive to the peak value of the vector sum of said first and third alternating voltages, said second resultant voltage being responsive to the peak value of the vector difference between said first and third alternating voltages, means for shifting the phase of said third voltage to provide a phase shifted third voltage, means for producing a second direct current output voltage responsive to the arithmetic difference between third and fourth resultant voltages, said third resultant voltage being responsive to the peak value of the vector sum of said first alternating voltage and said phase shifted third voltage, said fourth resultant voltage being responsive to the peak value of the vector difference between said first alternating voltage and said phase shifted third voltage, circuit breaker closure means responsive to said first and second direct current output voltages.

23. In a control system for a circuit breaker connecting a first alternating current system having a first alternating voltage to a second alternating current system having a second alternating voltage, means for producing a third alternating voltage responsive in phase to the vector difference between said first and second voltages but displaced in phase by a predetermined amount from said vector difference, means for producing a direct current output voltage responsive to the arithmetic difference between first and second resultant voltages, said first resultant voltage being equal to the peak value of the vector sum of said first, third alternating voltages and said second resultant voltage being responsive to the peak value of the vector difference between said first and third alternating voltages, means for producing a direct current output voltage when said first alternating voltage is zero, transistor switch means responsive to said direct current output voltage, circuit breaker closure means operative in response to said transistor switch means.

24. In a control system for a circuit breaker connecting a first alternating current system having a first alternating voltage to a second alternating current system having a second alternating voltage, means for producing a third alternating voltage responsive in phase to the vector difference between said first and second alternating voltages, means for producing a first direct current output voltage responsive to the arithmetic difference between first and second resultant voltages, said first resultant voltage being responsive to the peak value of the vector sum of the first and third alternating voltages and said second resultant voltage being responsive to the peak value of the vector difference between said first and third alternating voltages, means for producing a first direct current output voltage when said first alternating voltage is zero, transistor switch means responsive to said direct current output voltage, circuit breaker closure means operative in response to said transistor switch means.

25. In a control system for a circuit breaker connecting two alternating current circuits, a transistor switch having an input circuit and an output circuit, means for applying a first direct current output voltage to said transistor input circuit to control said transistor switch, said first direct current output voltage being responsive to the arithmetic difference between said first and second resultant voltages, said first resultant voltage being responsive to the peak value of the vector difference between the voltage on the first alternating current circuit and the voltage difference between the voltages on the first and second alternating current circuits, said second resultant voltage being responsive to the peak value of the vector sum of the voltage on said first alternating current circuit and the vector difference between the voltages on said first and second alternating current circuits, closure means for said circuit breaker, means connecting said closure means to be responsive to the condition of said transistor switch.

26. In a system having first and second alternating voltages, means for producing a third alternating voltage responsive in phase to the vector difference between said first and second alternating voltages, a first pair of transformers each having primary and secondary windings, means connecting the primary windings to said first pair of transformers in parallel circuit relation to be energized by a measure of said first voltage, a second pair of transformers each having primary and secondary windings, means connecting the primary windings of said second pair of transformers in parallel circuit relation to be energized by a voltage responsive to the vector difference between said first and second alternating voltages, means connecting said first pair of secondary windings to produce a sum voltage responsive to the vector sum of the voltages energizing the primary windings of said first and second pair of transformers, means connecting a second pair of said secondary windings to produce a difference voltage proportional to the vector difference between the voltages energizing the primary windings of said first and second pair of transformers, rectifier means for converting said sum and difference voltages into a first signal voltage responsive to the arithmetic difference between the peak values of said sum and difference voltages, a third pair of transformers each having primary and secondary windings, means connecting the primary windings of said third pair of transformers in parallel circuit relation to be energized by measure of said first voltage, a fourth pair of transformers each having primary and secondary windings, means connecting the primary windings of said fourth pair of transformers in parallel circuit relation to be energized by a fourth voltage responsive in phase to the vector difference between said first and second alternating voltages but displaced in phase by a predetermined amount from said vector difference, a third pair of said secondary windings on said third and fourth transformer pairs, means connecting said third pair of windings to produce a second sum voltage proportional to the vector sum of the voltages energizing primary windings of said third and fourth pair of transformers, a fourth pair of secondary windings on said third and fourth transformer pairs, means connecting said fourth pair of windings to produce a second difference voltage proportional to the vector difference of the voltages energizing the primary windings of said third and fourth pair of transformers, rectifier means for converting said second sum and difference voltages to a second signal voltage responsive to the arithmetic difference between the peak values of said second sum and difference voltages, control means responsive to said first and second signal voltages, voltage limit means associated with one transformer of said second pair of transformers for limiting the voltage across the secondary winding when the value of said third voltage approaches the value of said second voltage, voltage limit means associated with one transformer of said fourth pair of transformers for limiting the voltage across the secondary winding when the value of said third voltage approaches the value of said second voltage.

27. In a system having first and second alternating voltages, means for producing a third alternating voltage responsive in phase to the vector difference between the first and second alternating voltages, a first pair of transformers each having primary and secondary windings, means connecting the primary windings of said first pair of transformers in parallel circuit relation to be energized by measure of said first alternating voltage, a second pair of transformers each having primary and secondary windings, means connecting the primary windings of said second pair of transformers in parallel circuit relation to be energized by said third voltage, means connecting a first pair of said secondary windings to produce a sum voltage proportional to the vector sum of the voltages energizing the primary windings of said first and second pair of transformers, means connecting a second pair of said secondary windings to produce a difference voltage proportional to the vector difference between the voltages energizing the primary windings of said first and second pair of transformers, voltage limit means associated with one transformer of said second pair of transformers for limiting the voltage across the secondary winding when the value of said third voltage approaches the value of said second voltage, rectifier means for converting said sum and difference voltages into a first signal voltage responsive to the arithmetic difference between the peak values of said sum and difference voltages, a third pair of transformers each having primary and secondary windings, means connecting the primary windings of said third pair of transformers in parallel circuit relation to be energized by a measure of said first voltage, a fourth pair of transformers each having primary and secondary windings, means connecting the primary windings of said fourth pair of transformers in parallel circuit relation, phase shift means energized by said third voltage for producing a fourth voltage responsive in phase to the vector difference between said first and second alternating voltages but displaced in phase by a predetermined amount from said vector difference, means connecting the primary windings of said fourth pair of transformers in parallel circuit relation to be energized by said fourth voltage, a third pair of secondary windings on said third and fourth transformer pairs, means connecting said third pair of windings to produce a second sum voltage proportional to the vector sum of the voltages energizing the primary windings of said third and fourth pair of transformers, a fourth pair of secondary windings on said third and fourth transformer pairs, means connecting said fourth pair of windings to produce a second difference voltage proportional to the vector difference of the voltages energizing the primary windings of said third and fourth pair of transformers, voltage limit means associated with one transformer of said fourth pair of transformers for limiting the voltage across the secondary winding when the value of said third voltage approaches the value of said second voltage, rectifier means for converting the second sum and difference voltages to a second signal voltage responsive to the arithmetic difference between the peak value of said second sum and difference voltages, control means responsive to said first and second signal voltages.

28. In a system having first and second alternating voltages, means for producing a third alternating voltage responsive in phase to the vector difference between said first and second alternating voltages, a first pair of transformers each having primary and secondary windings, means connecting the primary windings of said first pair of transformers in parallel circuit relation to be energized by a measure of said first alternating voltage, a second pair of transformers each having primary and secondary windings, means connecting the primary windings of said second pair of transformers in parallel circuit relation to be energized by a voltage proportional to the vector difference between said first and second alternating voltages, means connecting a first pair of said secondary windings to produce a sum voltage proportional to the vector sum of the voltages energizing the primary windings of said first and second pair of transformers, means connecting a second pair of said secondary windings to produce a difference voltage proportional to the vector difference between the voltages energizing the primary windings of said first and second pair of transformers, voltage limit means associated with one transformer of said second pair of transformers for limiting the voltage across the secondary winding when the value of said third voltage approaches the value of said second alternating voltage, rectifier means for converting said sum and difference voltages into a first signal voltage responsive to the arithmetic difference between the peak values of said sum and difference voltages, a first transistor having emitter, collector and base elements, said transistor having an input circuit between said emitter and base elements and an output circuit between said collector and emitter elements, said input circuit including means for connection to said rectifier means to impress said first signal voltage across said emitter and base, capacitor means in parallel circuit with said base and emitter elements, a third pair of transformers each having primary and secondary windings, means connecting the primary windings of said third pair of transformers in parallel circuit relation to be energized by a measure of said first alternating voltage, a fourth pair of transformers each having primary and secondary windings, phase shift means energized by said third voltage for producing a fourth voltage responsive in phase to the vector difference between said first and second alternating voltages but displaced in phase by a predetermined amount from said vector difference, means connecting the primary windings of said fourth pair of transformers in parallel circuit relation to be energized by said fourth voltage, a third pair of secondary windings on said third and fourth transformer pairs, means connecting said third pair of windings to produce a second sum voltage proportional to the vector sum of the voltages energizing the primary windings of said third and fourth pair of transformers, a fourth pair of said secondary windings on said third and fourth transformer pairs, means connecting said fourth pair of windings to produce a second difference voltage proportional to the vector difference of a voltage energizing the primary windings of said third and fourth pair of transformers, voltage limit means associated with one transformer said fourth pair of transformers limiting the voltage across the secondary winding when the value of said third alternating voltage approaches the value of said second alternating voltage, rectifier means for converting second sum and difference voltages to a second signal voltage responsive to the arithmetic difference between the peak values of said sum and difference voltages, a second transistor having emitter, collector and base elements, said second transistor having an input circuit between said emitter and base elements and an output circuit between said collector and emitter elements, said input circuit including means for connection to said second rectifier means to impress said second signal voltage across said emitter and base, capacitor means in parallel circuit with said base and emitter elements of said second transistor, said output circuits of said first and second transistors including power source and circuit breaker closing means, said transistors so disposed with relation to said power source and said closing means that the transfer of power to circuit breaker closing means is controlled by the condition of said transistors.

29. In a system having first and second alternating voltages, means for producing a third alternating voltage responsive in phase to the vector difference between said first and second alternating voltages, transformer means for combining said first and third voltages according to their vector sum and vector difference, means responsive to the differential of the peak values of said vector sum and said vector difference.

30. In a system having first and second alternating voltages, means for producing a third alternating voltage responsive to the vector difference between said first and second alternating voltages but displaced in phase by a predetermined amount from said vector difference, transformer means for combining said first and third voltages according to their vector sum and vector difference, means responsive to the differential of the peak values of said vector sum and said vector difference.

31. In a system having first and second alternating voltages, means for producing a third alternating voltage responsive in phase to the vector difference between said first and second alternating voltages, transformer means for combining said first and third voltages to provide first and second resultant voltages, said first resultant voltage being responsive to the vector sum of said first and third alternating voltages, said second resultant voltage being responsive to the vector difference between said first and third alternating voltages, control means differentially responsive to said first and second resultant voltages.

32. In a system having first and second alternating voltages, means for producing a third alternating voltage responsive to the vector difference between said first and second alternating voltages but displaced in phase by a predetermined amount from said vector difference, transformer means for combining said first and third voltages to provide first and second resultant voltages, said first resultant voltage being responsive to the vector sum of said first and third alternating voltages, said second resultant voltage being responsive to the vector difference between said first and third alternating voltages, control means differentially responsive to said first and second resultant voltages.

No references cited.

UNITED STATES PATENT OFFICE
CERTIFICATE OF CORRECTION

Patent No. 2,900,528                                        August 18, 1959

John Baude

It is hereby certified that error appears in the printed specification of the above numbered patent requiring correction and that the said Letters Patent should read as corrected below.

Column 12, line 50, for "voltage" read -- voltages --; line 54, for "voltages energizing the primary windings of said" read -- peak values of said sum and difference voltages, --; column 14, line 35, for "tbe" read -- be --; line 65, for "connetcing" read -- connecting --; column 15, line 66, for "first, third" read -- first and third --; same line 66, for "voltages and" read -- voltages, --.

Signed and sealed this 9th day of February 1960.

(SEAL)
Attest:

KARL H. AXLINE                                       ROBERT C. WATSON
Attesting Officer                                  Commissioner of Patents